April 1, 1924.
A. KOLISTER
LICENSE PLATE HOLDER
Filed Oct. 6, 1922
1,489,220
2 Sheets-Sheet 1
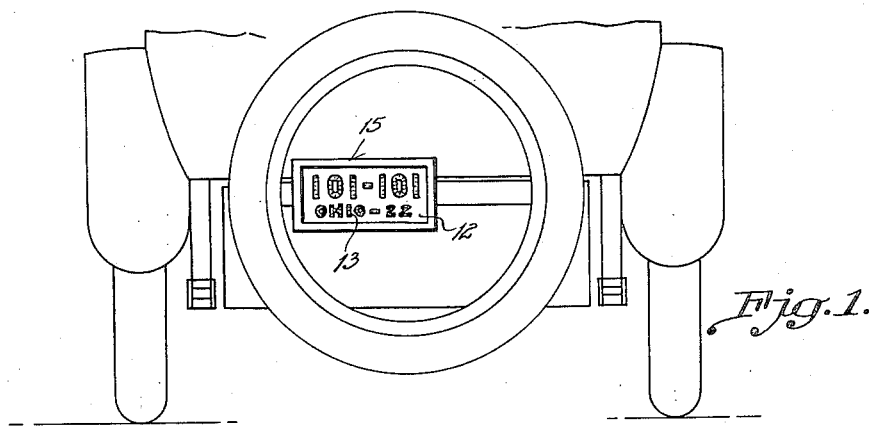
Fig. 1.
Fig. 2.
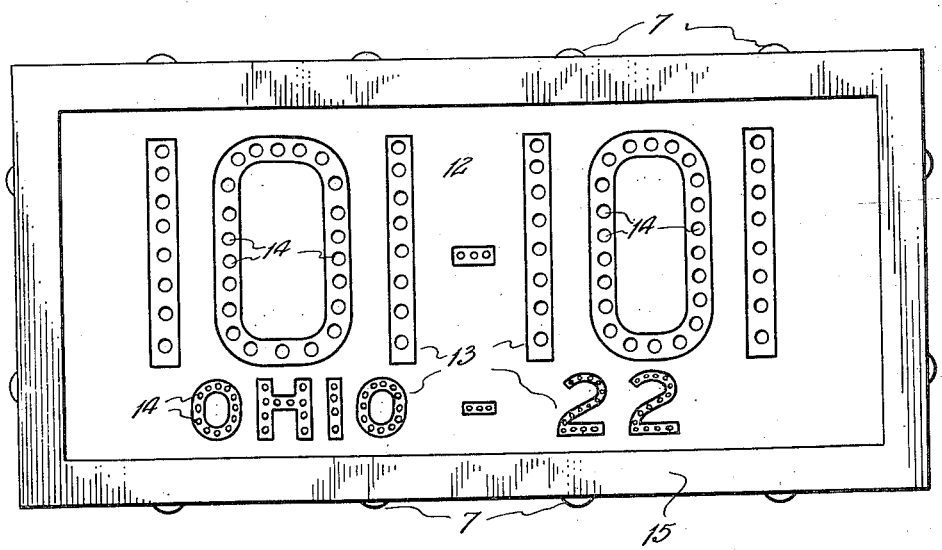
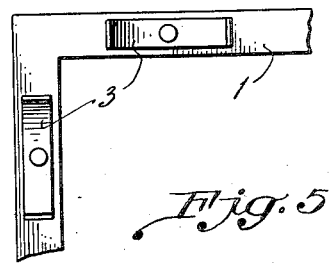
Fig. 5.
A. Kolister
INVENTOR
BY Victor J. Evans
ATTORNEY
WITNESS:

April 1, 1924.

A. KOLISTER

LICENSE PLATE HOLDER

Filed Oct. 6, 1922   2 Sheets-Sheet 2

1,489,220

A. Kolister
INVENTOR

BY Victor J. Evans
ATTORNEY

WITNESS:

Patented Apr. 1, 1924.

1,489,220

UNITED STATES PATENT OFFICE.

ANDREW KOLISTER, OF ATHENS, OHIO.

LICENSE-PLATE HOLDER.

Application filed October 6, 1922. Serial No. 592,815.

*To all whom it may concern:*

Be it known that I, ANDREW KOLISTER, a citizen of the United States, residing at Athens, in the county of Athens and State of Ohio, have invented new and useful Improvements in License-Plate Holders, of which the following is a specification.

This invention relates to a license plate holder for motor vehicles, the general object of the invention being to provide means for illuminating a license plate so that the same can be seen from a great distance.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a fragmentary view of an automobile showing the invention in use.

Figure 2 is an enlarged front view of the device itself.

Figure 5 is a detail view showing the spring clips.

Figure 3:
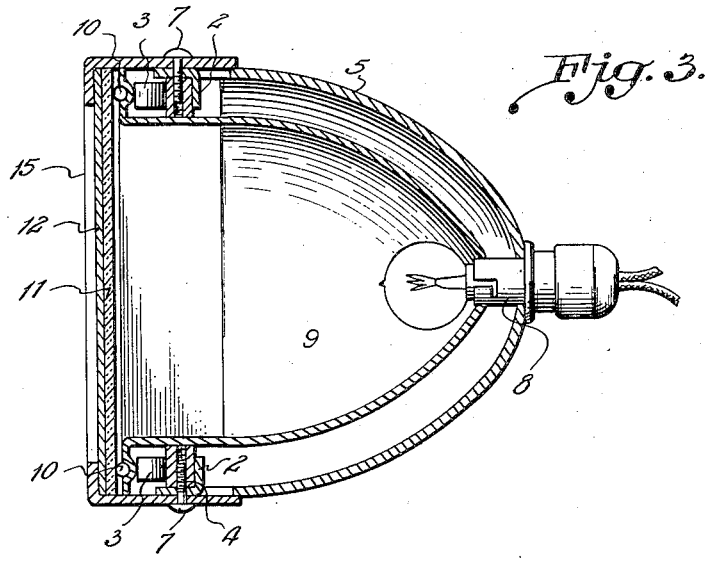
Figure 3 is a sectional view.
Figure 4:
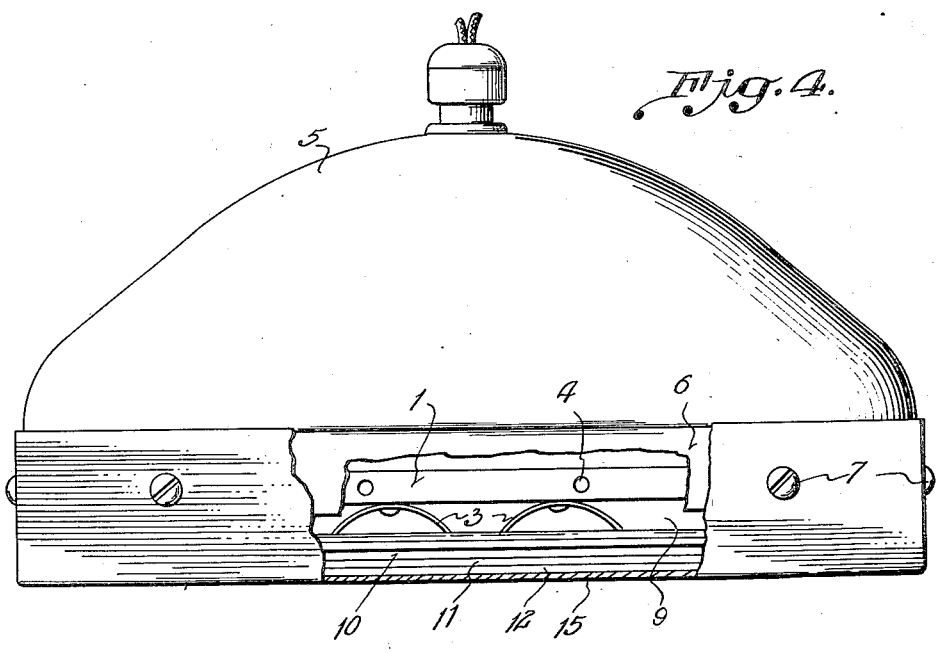
Figure 4 is a top plan view with parts broken away.

In these views 1 indicates a rectangular frame which is provided with the braces 2. This frame has riveted thereto the substantially U-shaped spring clips 3 and it is provided with screw threaded holes 4. A casing 5 has its square front 6 secured to the frame by the screws 7, said casing tapering rearwardly where it is provided with a lamp socket 8 for receiving an electric bulb. A reflector 9 of substantially the same shape as the casing has a flange at its front which engages the spring clips 3. The flange is provided with a groove in which is located a gasket 10 against which rests a transparent member 11 and a license plate 12 rests against the transparent member, said plate having figures and letters thereon, as indicated at 13, said letters being formed in part of perforations 14 so that the light rays can pass through the same. The parts are held in position by a cap 15 which is fastened to the frame by the screws 7 which hold the casing to the frame.

From the above it will be seen that the rays of light passing through the perforations in the characters will illuminate the same and thus render the numbers and letters visible at a great distance. The transparent members may be made of different colors so that the characters will be colored.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A license plate holder comprising a casing, a frame located within the casing and detachably connected with the open front thereof, a plurality of substantially U-shaped springs carried by the frame, a reflector located within the casing and having a grooved flange at its front which engages the springs, a gasket carried by the flange and arranged in the groove thereof, a transparent plate resting against the gasket, a perforated license plate engaging the transparent plate and a cap having a flange engaging the edges of the license plate and means for detachably connecting the cap with the casing and frame.

In testimony whereof I affix my signature.

ANDREW KOLISTER.